Dec. 26, 1950  M. M. GROOM  2,535,283
BICYCLE STABILIZING ATTACHMENT
Filed Oct. 4, 1948  2 Sheets-Sheet 1

Max M. Groom
INVENTOR.

Dec. 26, 1950 M. M. GROOM 2,535,283
BICYCLE STABILIZING ATTACHMENT
Filed Oct. 4, 1948 2 Sheets-Sheet 2
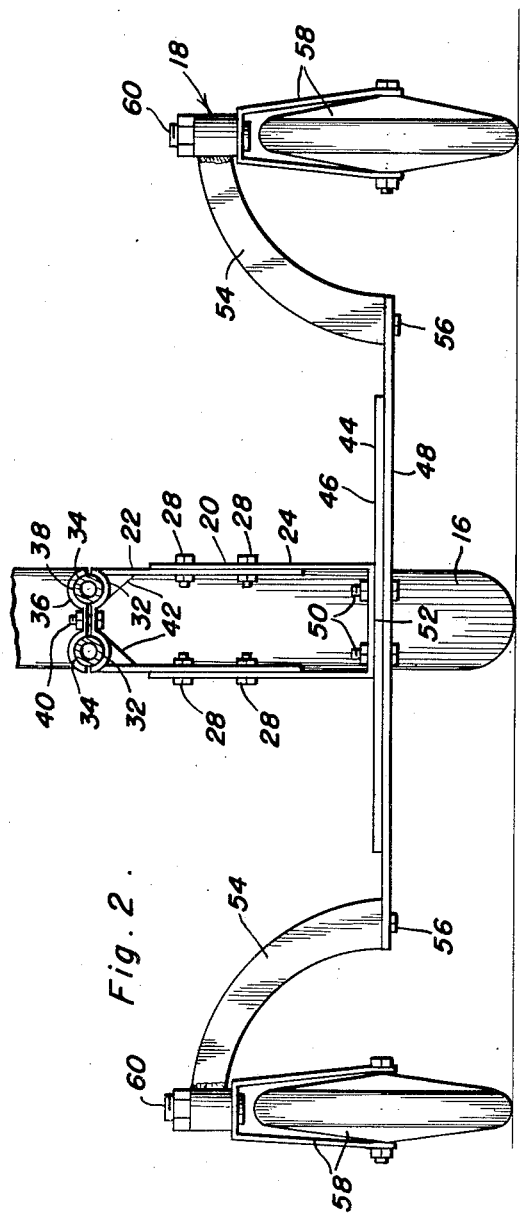
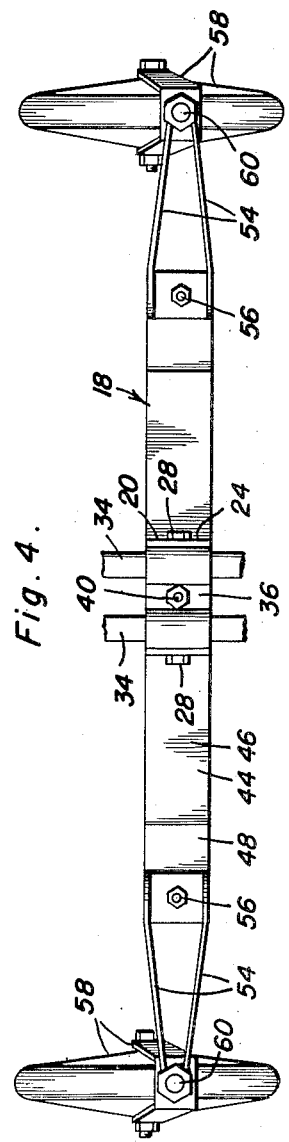
Max M. Groom
INVENTOR.

Patented Dec. 26, 1950

2,535,283

UNITED STATES PATENT OFFICE 2,535,283

BICYCLE STABILIZING ATTACHMENT

Max M. Groom, Perry, Okla.

Application October 4, 1948, Serial No. 52,646

1 Claim. (Cl. 280—293)

This invention relates to new and useful improvements and structural refinements in bicycles, and the principal object of the invention is to facilitate stabilizing of a bicycle so as to permit unskilled riders to easily maintain their balance.

This object is achieved by the provision of what may be referred to as a stabilizing attachment for bicycles, the same including a pair of casters mounted at the outer ends of a structure which projects laterally to both sides of the bicycle and is attached to the horizontal, rear wheel supporting fork with which bicycles are usually equipped.

An important feature of the invention involves the provision of a resilient member to which the casters are connected, whereby steering and passage of the bicycle over uneven terrain is facilitated.

Another feature of the invention resides in the provision of means for adjusting the attachment as to height above the ground, whereby the attachment may be effectively employed in association with bicycles of different sizes and types.

Some of the advantages of the invention lie in its simplicity of construction, convenience of operation, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 2 is a transverse cross-sectional view, taken substantially in the plane of the line 2—2 in Figure 1;

Figure 4 is a top plan view of the invention.

Like characters of reference are employed to designate like parts in the specification and throughout the several views.

Figure 1:
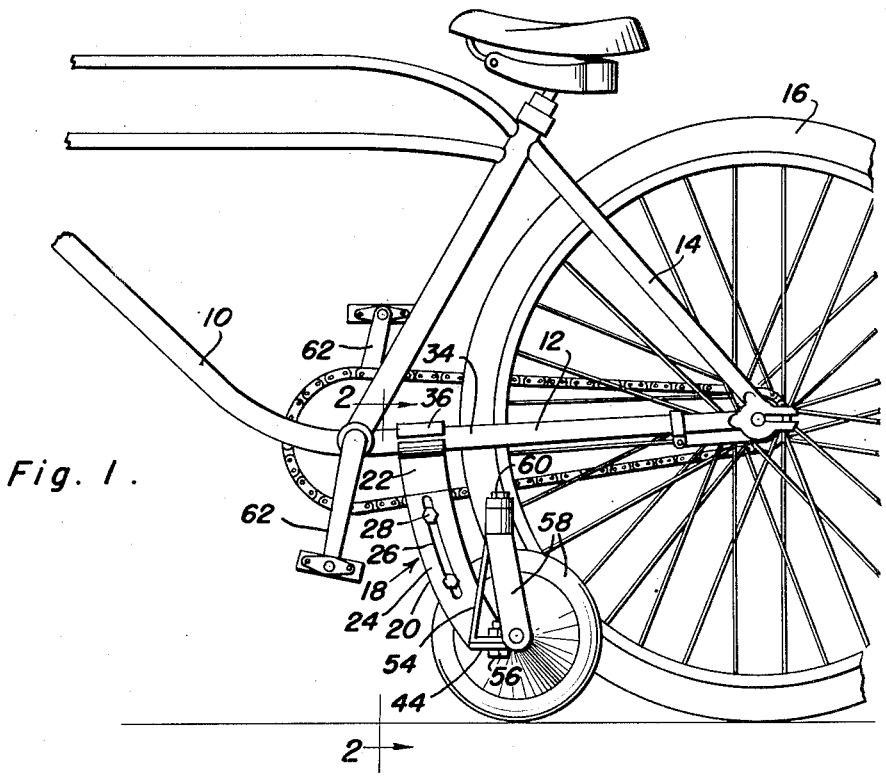
Figure 1 is a fragmentary side elevational view of a bicycle, showing the invention in association therewith.
Figure 3:
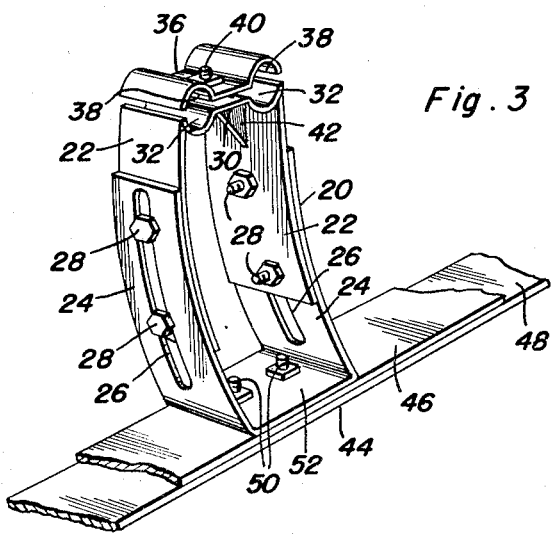
Figure 3 is a fragmentary perspective view of the bracket and leaf spring used in the invention.

Referring now to the accompanying drawings in detail, the general reference character 10 designates the conventional bicycle including the usual, substantially horizontal fork 12 which, together with a forwardly and upwardly inclined fork 14, supports a rear wheel 16, as will be clearly apparent.

The invention resides in the provision of a stabilizing attachment designated generally by the reference character 18, this embodying in its construction a bracket 20 including a pair of substantially U-shaped sections 22, 24, these being configurated substantially as shown and the section 24 being provided with a pair of slots 26 to receive suitable bolts 28, whereby the two sections are adjustably secured together. That is to say, the bolts 28 extend through suitable apertures (not shown) formed in the bracket section 22, and by simply loosening these bolts, the two sections may be slid, one with respect to the other, so that their overall length is increased or decreased, as desired.

The bight portion 30 of the bracket section 22 is formed with a pair of spaced grooves 32 to receive the side members 34 of the bicycle fork 12, while a clamping plate 36, formed with further grooves 38, is attached to the bight portion 30 of the bracket section 22 by a bolt 40, the pairs of grooves 32, 38 coacting together in clamping against the fork side members 34 when the screw 40 is tightened, whereby the entire attachment is firmly yet removably secured to the bicycle.

If desired, suitable gussets 42 may be provided in the bracket section 22 to reinforce the bight portion 30, as will be clearly apparent.

A transversely extending leaf spring 44, consisting of a plurality of leaves or laminations 46, 48, etc., is secured at its midportion as at 50 to the bight portion 52 of the bracket section 24, the spring 44 extending laterally to both sides of the bicycle and carrying at its outer ends a pair of upwardly and outwardly arcuated wheel supports 54 which are secured to the longest leaf 48 of the spring 44 as at 56.

A pair of suitable caster units 58 are swingably attached to the wheel supports 54 by suitable kingpins 60, the configuration of the wheel supports 54 being such as to facilitate unrestricted swivelling of the caster units, as will be clearly apparent.

When the invention is placed in use, the bracket 20 is attached to the bicycle fork 12 by means of the clamp means 30, 32, 36, 38 and 40, and by loosening the screws 28 and adjusting the bracket sections 22, 24 so as to increase or decrease the length of the bracket, appropriate setting, suitable for the particular bicycle employed, is made to assure that the caster units 58 are in engagement with the ground while the bicycle is disposed in its upright position.

Thereupon the bicycle may be driven by riders of limited skill or by unskilled riders with ease and convenience, permitting them to maintain their balance, since the stabilizing attachment, particularly the casters 58 thereof, will prevent the bicycle from falling to one side or the other.

Needless to say, the leaf spring 44 will facilitate steering and travel of the bicycle over uneven ground without "road shock" being transmitted by the casters 58 to the bicycle frame, and it is to be noted that the bracket 20, extending downwardly from the bicycle fork 12, is preferably curved rearwardly toward the wheel 16, so that the attachment does not interfere with the operation of the bicycle pedals 62.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A stabilizing attachment for bicycles, comprising an inverted U-shaped bracket including a bight portion and a pair of downwardly extending side members, said bight portion being provided with a pair of spaced grooves to receive respective side pieces of a bicycle rear wheel supporting fork, a clamping screw extending upwardly through said bight portion, a grooved fork clamping plate provided on said screw, a complemental bracket having a U-shaped configuration and including a bight portion and a pair of upwardly extending side members, said last mentioned side members overlapping the respective side members of the first mentioned bracket and being provided with longitudinally extending slots, locking screws provided in the side members of the first bracket and slidably adjustable in said slots whereby the complemental bracket may be adjusted vertically relative to the first bracket, a leaf spring secured intermediate the ends thereof to the bight portion of the complemental bracket and projecting laterally to both sides thereof, a pair of upwardly and outwardly extending wheel supports provided at the opposite ends of said spring, and a pair of swivel casters attached to the respective wheel supports.

MAX M. GROOM.

REFERENCES CITED

The following references are of record in the file of this patent:

UNITED STATES PATENTS

| Number | Name | Date |
| --- | --- | --- |
| 563,819 | Timms | July 14, 1896 |
| 2,022,604 | Rasmuss | Nov. 26, 1935 |

FOREIGN PATENTS

| Number | Country | Date |
| --- | --- | --- |
| 538 | Great Britain | 1885 |
| 20,815 | Great Britain | 1892 |
| 59,635 | Denmark | Apr. 7, 1942 |